United States Patent [19]
Jones

[11] Patent Number: 5,431,189
[45] Date of Patent: Jul. 11, 1995

[54] FLOW CONTROL MANIFOLD AND GAUGE

[76] Inventor: Ronald H. Jones, 46 Moody Dr., Sandwich, Mass. 02563-1880

[21] Appl. No.: 326,821

[22] Filed: Oct. 20, 1994

Related U.S. Application Data

[63] Continuation-in-part of Ser. No. 197,942, Feb. 17, 1994, abandoned.

[51] Int. Cl.⁶ .......................................... F16K 11/085
[52] U.S. Cl. ................................. 137/625.42; 62/292
[58] Field of Search .................... 62/292; 137/625.42

[56] References Cited

U.S. PATENT DOCUMENTS

3,021,869  2/1962  Ross ........................ 137/625.47 X
4,516,603  5/1985  Mock ............................. 62/292 X
4,881,961  11/1989  Mock ............................. 62/292

Primary Examiner—John C. Fox
Attorney, Agent, or Firm—John P. McGonagle

[57] ABSTRACT

A switching manifold in conjunction with a refrigerant gauge which provides means for switching between refrigerant testing, charging, liquid recovery and vapor recovery modes without the need to change or reconnect any hoses and/or conduits. The invention contains a matrix of channels to which a refrigeration system, recovery machine and recovery tank may be connected. Vapor and fluid flows are directed by a cylindrical switch assembly without the need for conduit changes.

9 Claims, 10 Drawing Sheets

FLOW CONTROL MANIFOLD AND GAUGE

CROSS-REFERENCE

This is a continuation-in-part of Ser. No. 08/197,942, filed Feb. 17, 1994 now abandoned.

BACKGROUND OF THE INVENTION

The present invention relates to mechanical refrigeration equipment, and more particularly to a device for measuring and controlling the recovery of refrigerant from a mechanical refrigeration system.

Mechanical refrigeration systems are used in a wide variety of applications. These applications include refrigerators, heat pumps, and air conditioners used both in vehicles and in buildings. The vast majority of mechanical refrigeration systems operate according to similar, well known principles, employing a closed-loop fluid circuit through which refrigerant flows. Fluorocarbon refrigerants are the types of refrigerants used most widely today.

Mechanical refrigeration systems periodically require servicing. This servicing often takes the form of the addition of refrigerant into the system to replace refrigerant which has escaped from the system. Other servicing often takes the form of repairs to, or replacements of components in the system such as compressors, evaporators, filters, dryers, expansion valves and condensers.

Before servicing a mechanical refrigeration system, i.e., repairing or replacing one or more components, or even adding refrigerant, it is often necessary to remove the original refrigerant remaining in the system. Historically and typically, this remaining refrigerant was removed by bleeding off the refrigerant to the atmosphere. In recent years, much concern has arisen about this practice of releasing fluorocarbon-based refrigerants into the atmosphere. The release of such fluorocarbons is believed to deplete the concentration of ozone in the atmosphere. This ozone depletion is believed to adversely affect the environment and human health. Numerous laws have been passed requiring recovery of the refrigerant rather than venting.

To avoid releasing fluorocarbons into the atmosphere, devices have been constructed that are designed to recover the refrigerant from the refrigeration system. One difficulty encountered with the removal of refrigerant is the time required to remove the refrigerant. Although removal time is not that critical when servicing a relatively small volume refrigeration system, such as the air conditioning system in a car, or a room air conditioning system, the time required to remove refrigerant from a large system can be substantial. Examples of larger mechanical refrigeration systems include commercial freezers and refrigerators, and air conditioning systems used in commercial, industrial and office buildings.

Mechanical refrigeration systems typically have a high pressure port and a low pressure port through which refrigerant can be introduced to, or removed from the system. The refrigerant in the area of the system adjacent to the high pressure port of the refrigeration system is typically in liquid form. The refrigerant adjacent to the low pressure port of the refrigeration system is typically in a gaseous state.

Most refrigerant purge systems remove the refrigerant from the refrigeration system by evacuating the refrigerant in a gaseous form from the low pressure port of the refrigeration system. Purging is accomplished by means of a recovery machine. A recovery machine sucks in refrigerant at one port and discharges at another (much like a vacuum). Refrigerant can be recovered in either a gaseous or liquid state. Liquid recovery is much faster than vapor. It has been found that the time required to remove refrigerant from a refrigeration system is decreased substantially if the refrigerant is recovered from the system as liquid refrigerant, by removing refrigerant through the high pressure port of the mechanical refrigeration system.

Several difficulties exist with the removal of liquid refrigerant from a refrigeration system. Because liquid refrigerant is non compressible, some measures must be taken to protect the recovery machine. These measures slow down the recovery process. One difficulty is that a compressor cannot be used to draw liquid refrigerant out of the system directly, by placing the compressor in the conduit between the mechanical refrigeration system and a storage tank. The flow of liquid refrigerant through a compressor will likely damage or destroy the compressor.

Another difficulty is that to remove the liquid refrigerant efficiently, pressure should be maintained on the liquid refrigerant to maintain the liquid refrigerant in a liquid state as it moves from a mechanical refrigeration system into the storage tank. If the liquid refrigerant is allowed to expand into its gaseous form, much of the time efficiencies gained by removal of the refrigerant as liquid refrigerant is lost.

One method which has been developed to take advantage of the speed of removal in the liquid state and the ease on equipment of removal in the gaseous state, is the so-called "Push/Pull" method. The Push/Pull method is accomplished as follows. The recovery machine is connected so that it draws vapor off the top of a recovery cylinder. The recovery machine then "pushes" the vapor into the low side of the mechanical refrigeration system being recovered. The vapor pressure in the mechanical refrigeration system increases to a point that it exceeds the liquid pressure in the mechanical refrigeration system and "pushes" the liquid out through the high side of the mechanical refrigeration system into the recovery tank liquid port. This process is monitored via a sight glass. When no more liquid is seen, residual vapor recovery to levels set forth by the Federal Government is begun. The hose or conduit connections are re-arranged so that the recovery machine draws, i.e., "pulls", the residual vapor into the recovery tank until the system is basically void of refrigerant. The advantage of the Push/Pull method is an eight fold increase in recovery speed over prior art techniques.

However, there are drawbacks with this method, primarily in the time lost in removing and reconnecting hoses and/or conduits, as well as the risk of venting small amounts of refrigerant to the atmosphere during switch over.

The first step to recovering refrigerant is to connect a test manifold gauge set to the mechanical refrigeration system, i.e., unit being serviced. After a service person has attached the gauge set to the unit and has determined that the refrigerant must be recovered to accomplish repairs, the service person must attach a recovery machine to the unit. In order to recover liquid with the push/pull method, the service person must position and attach hoses in a different configuration than for the initial testing. Then to complete the recovery in a vapor state, the service person must again reposition the hoses.

SUMMARY OF THE INVENTION

In view of the foregoing disadvantages inherent in the known types of devices now present in the prior art, the present invention provides a flow control manifold and gauge device. As such, the general purpose of the present invention, which will be described subsequently in greater detail, is to provide a means of using the Push/Pull method of recovering refrigerant from a mechanical refrigeration system without the need for removing and reconnecting hoses.

To attain this, the present invention provides a switching manifold in conjunction with a refrigerant gauge which provides the means for switching between refrigerant testing, charging, liquid recovery and vapor recovery modes without the need to change or reconnect any hoses and/or conduits. The present invention permits a one-time connection of hoses and conduits. The service person can then test and make a decision regarding the needs of the mechanical refrigeration system. If recovery is needed, the service person can connect a recovery machine and a refrigerant cylinder to the indicated ports on the invention. The invention switch can then be set for liquid recovery and then vapor recovery. Following recovery, the invention can then be switched to a test/charge position whereby the mechanical refrigeration system can be refilled with refrigerant. All of these actions may be taken without the need to reconfigure hoses for each procedure.

Accordingly, it is a primary objective of the present invention to provide a testing device that is capable of directing the flow of pressure media so as to accomplish the recovery of said pressure media in an efficient and safe manner that is easily understood by a person working in the refrigerant recovery field.

This together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
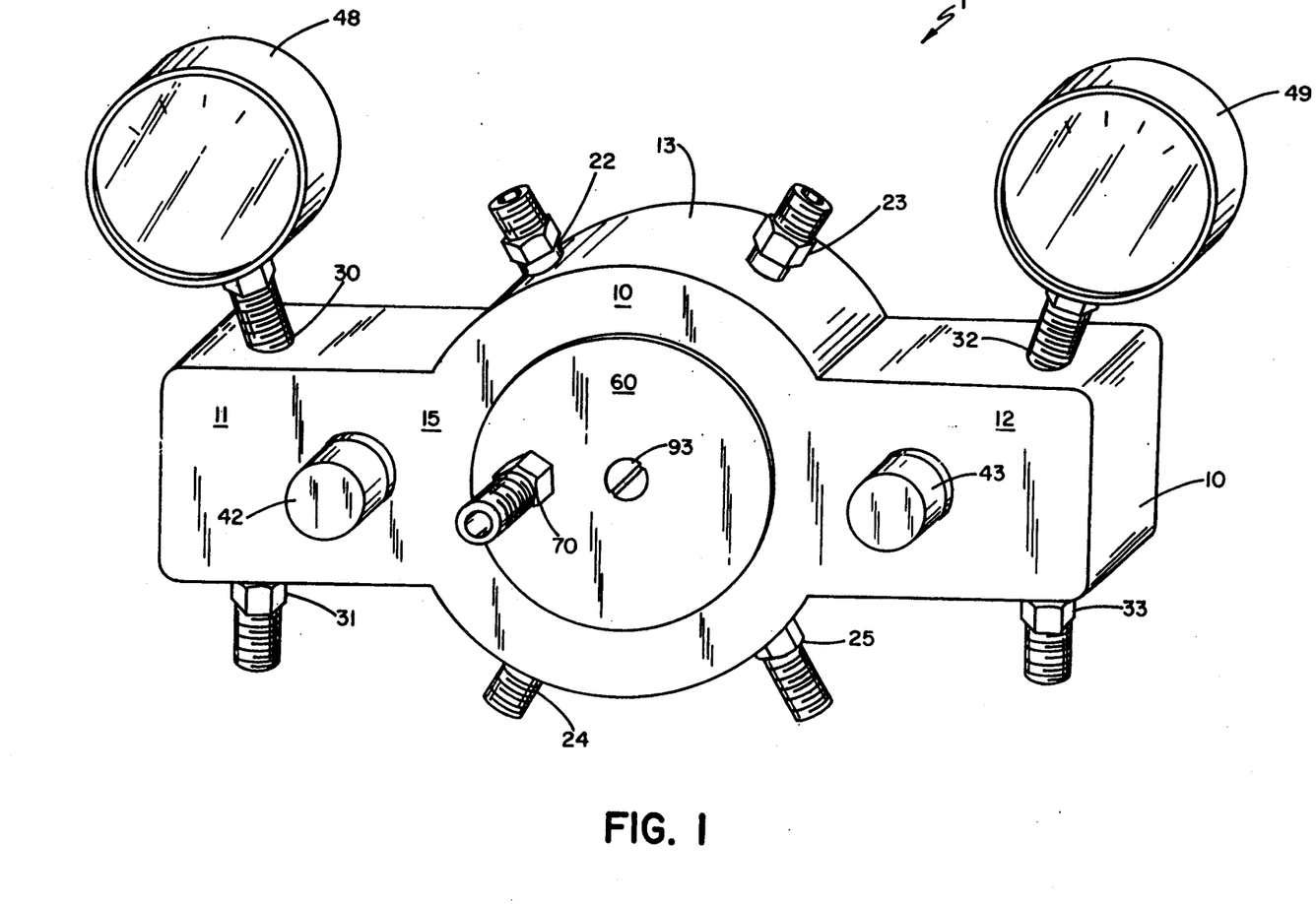
FIG. 1 is a front perspective view of the invention.
Figure 2:
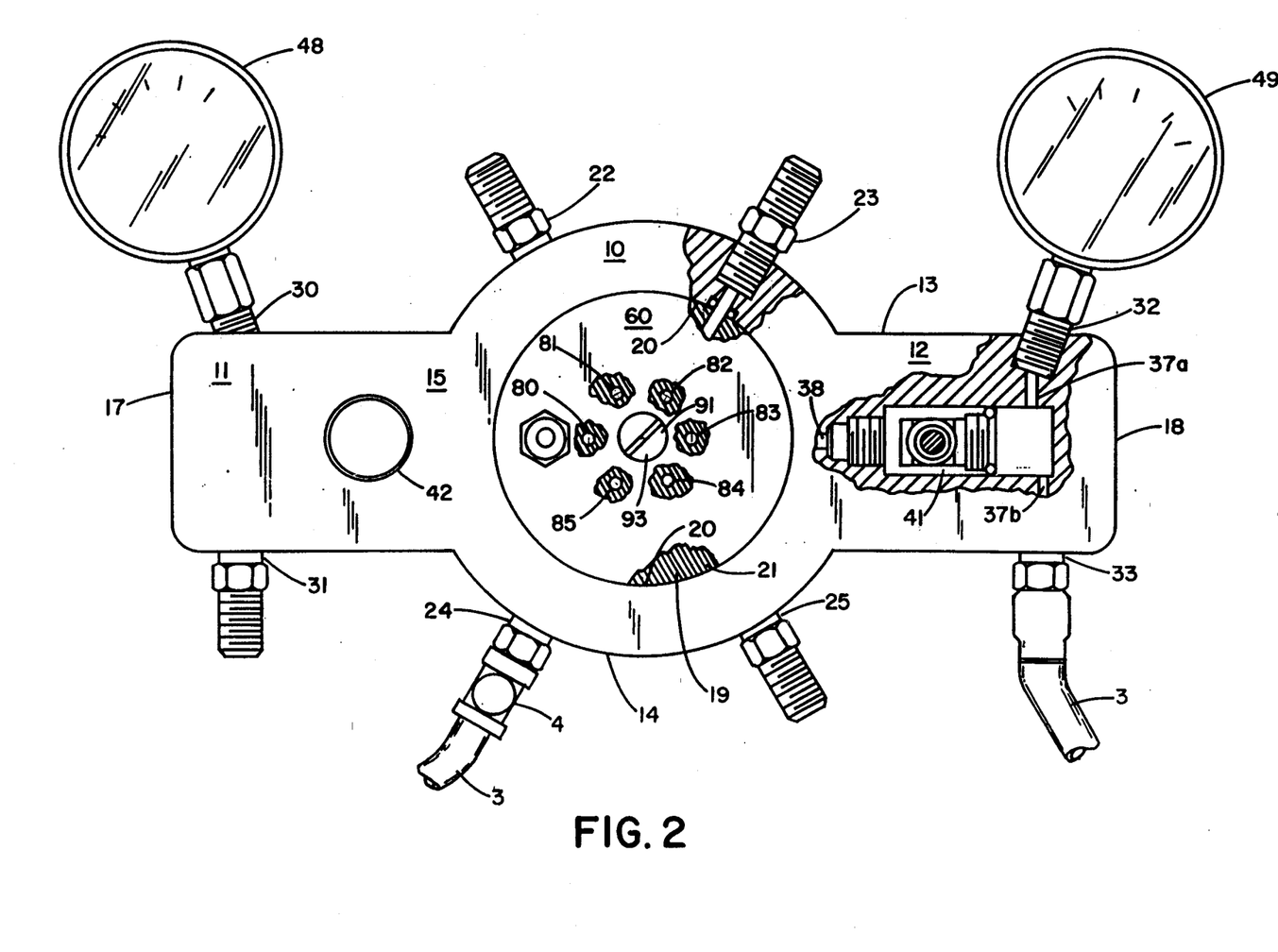
FIG. 2 is a front plan view of the invention, partly in section.
Figure 3:
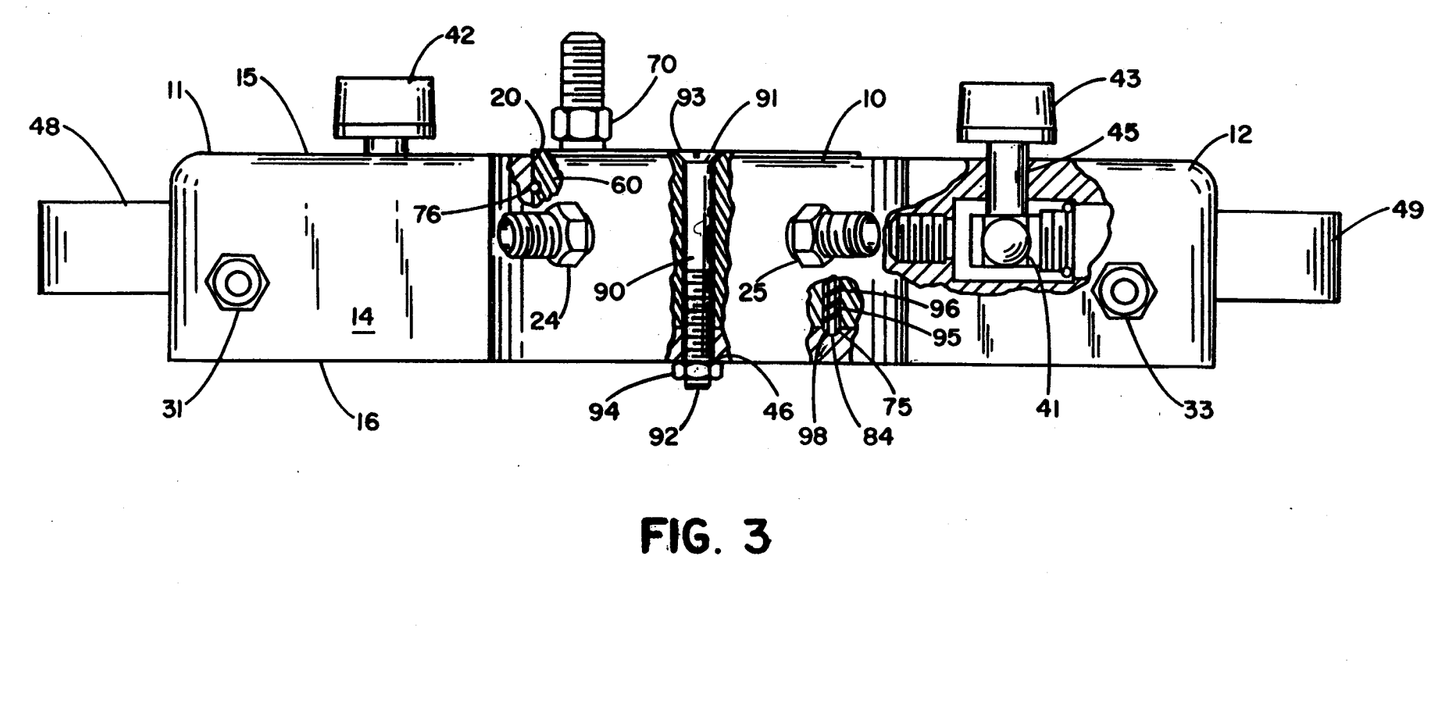
FIG. 3 is a bottom plan view of the invention, partly in section.

Referring to the drawings in detail wherein like elements are indicated by like numerals, there is shown an embodiment of the invention 1 incorporating a flow control manifold and gauge. The invention 1 is comprised of a housing 2 having two gauges 48, 49 and a cylindrical switch assembly 60. The housing 2 is generally divided into a central section 10, and left 11 and right 12 lateral sections. The housing 2 has a top 13, bottom 14, front 15, rear 16, left side 17 and right side 18. The central section 10 has a generally cylindrical shape with radial axes in planes parallel to planes formed by the housing front 15 and rear 16. The lateral sections 11, 12 have generally rectangular shapes and protrude leftward and rightward from the central section 10. The central section 10 has a right circular cylindrical cavity 19 coincident with the cylindrical shape of the central section 10.

The cavity 19 has an open front 21 in the same plane as the housing front 15. The cavity 19 has a cylindrical side wall 20 extending from the housing rear 16 to the open front 21. The central section 10 has four open ports, one 22 on the housing top 13 near to the left lateral section 11, another 23 on the housing top 13 near to the right lateral section 12, another 24 on the housing bottom 14 near to the left lateral section 11, and the last 25 on the housing bottom 14 near to the right lateral section 12. Each port 22, 23, 24, 25 is interconnected by an individual channel 26, 27, 28, 29, respectively, formed within the central section 10 to the central section cavity 19.

The left lateral section 11 has two open ports, one 30 on the housing top 13 and the other 31 on the housing bottom 14. The right lateral section 12 also has two open ports, one 32 on the housing top 13 and the other 33 on the housing bottom 14. Each of the left lateral ports 30, 31 are interconnected by a primary channel 34 formed within the left lateral section 11. A secondary channel 35 formed within the left lateral section 11 interconnects the left lateral primary channel 34 at its midpoint 36 with the central section cavity 19. Each of the right lateral ports 32, 33 are interconnected by a primary channel 37 formed within the right lateral section 12. A secondary channel 38 formed within the right lateral section 12 interconnects the right lateral primary channel 37 at its midpoint 39 with the central section cavity 19.

Each lateral section 11, 12 has a switch valve 40, 41 positioned at the junction 36, 39 of its primary channel 34, 37 and secondary channel 35, 38, said switch valve 40, 41 being adapted to close off a secondary channel 35, 38 from the primary channel 34, 37. Each switch valve 40, 41 is actuated by an external actuator handle 42, 43 external to the relative housing lateral section 11, 12 and interconnected to the appropriate valve 40, 41 by an actuator arm 44, 45.

The central section channels 26, 27, 28, 29 and lateral section secondary channels 35, 38 open into the central section cavity 19 at open cavity ports 50, 51, 52, 53, 54, 55 formed in the cavity side wall 20, said ports being positioned in a plane parallel to the housing front 15 and rear 16 at points circumferentially equidistant from each other 60° apart. The cavity ports 50, 51, 52, 53, 54, 55 are located in a plane at an approximate longitudinal midpoint between the cavity front 21 and housing rear 16. The left lateral secondary channel 35 terminates at cavity port 50 which is defined as the 0° cavity port position. The central section left top channel 26 terminates at cavity port 51 which is defined as the 60° cavity port position. The central section right top channel 27 terminates at cavity port 52 which is defined as the 120° cavity port position. The right lateral secondary channel 38 terminates at cavity port 53 which is defined as the 180° cavity port position. The central section right bottom channel 29 terminates at cavity port 54 which is defined as the 240° cavity port position. The central section left bottom channel 28 terminates at cavity port 55 which is defined as the 300° cavity port position.

Figure 4:
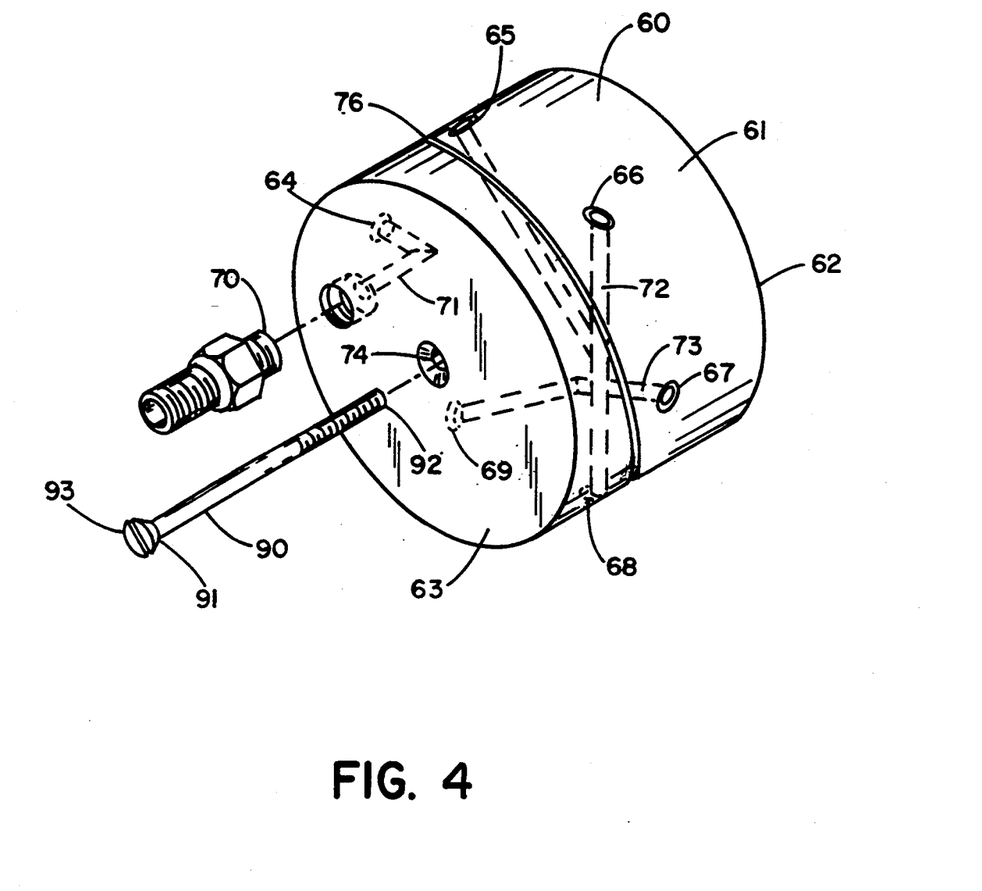
FIG. 4 a front perspective view of the cylindrical switch assembly.
Figure 5:
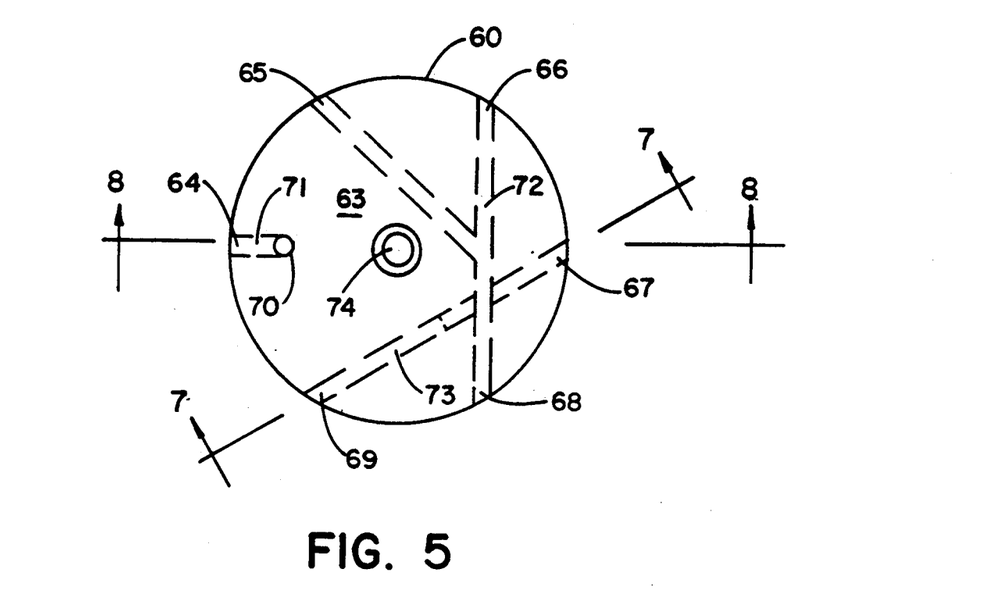
FIG. 5 is a front plan view of the cylindrical switch assembly.
Figure 6:
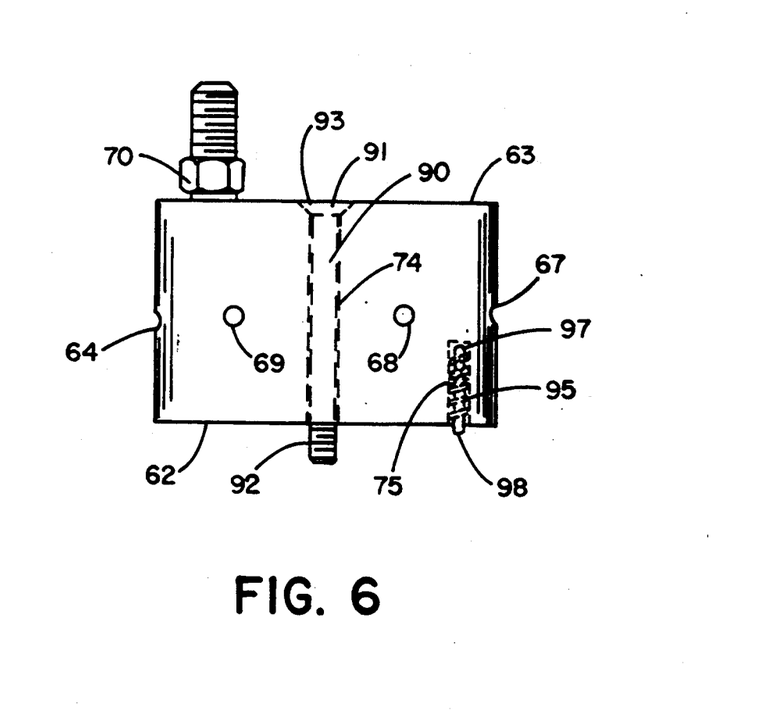
FIG. 6 is a bottom plan view of the cylindrical switch assembly.

A cylindrical switch assembly 60 is rotatably and concentrically affixed within the housing central cavity 19. The switch assembly 60 has a generally solid right circular cylindrical shape with a cylindrical side 61 extending from a rear side 62 to a front side 63, said rear side 62 and front side 63 being in parallel planes. The radial diameter of the switch assembly 60 is slightly less than the radial diameter of the cavity 19.

The switch assembly 60 has six open ports 64, 65, 66, 67, 68, 69 formed in its cylindrical side 61, said ports being positioned in a plane parallel to the assembly front 63 and rear 62 at points circumferentially equidistant from each other 60° apart. The switch assembly ports 64, 65, 66, 67, 68, 69 are located in a plane at an approximate longitudinal midpoint between the assembly front 63 and rear 62. The first assembly port 64 is defined as the 0° assembly port position. The second assembly port 65 is defined as the 60° assembly port position. The third assembly port 66 is defined as the 120° assembly port position. The fourth assembly port 67 is defined as the 180° assembly port position. The fifth assembly port 68 is defined as the 240° assembly port position. The sixth assembly port 69 is defined as the 300° assembly port position. The switch assembly 60 has a seventh open port 70 formed in its front side 63, said port 70 being positioned near to the assembly side 61 along a radial axis parallel to the radial axis of the first assembly port 64.

Figure 7:
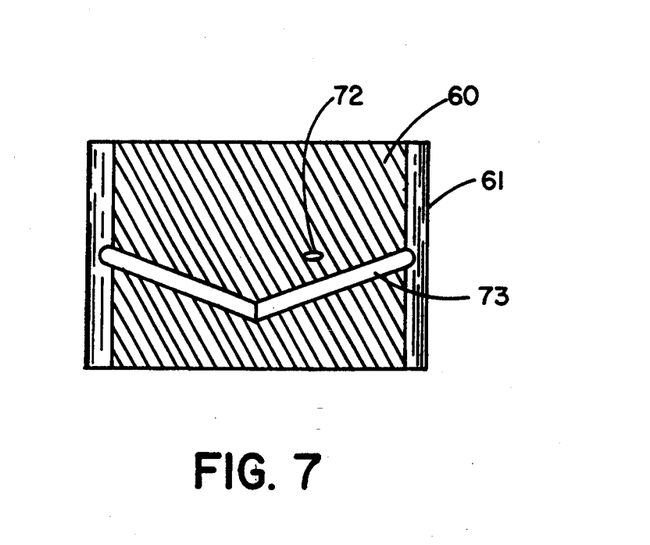
FIG. 7 is a bottom sectional view along the line 7—7 of FIG. 5.
Figure 8:
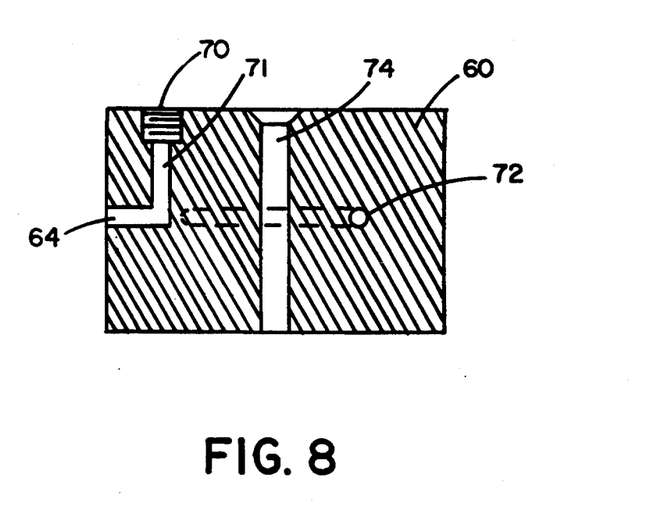
FIG. 8 is a bottom sectional view along the line 8—8 of FIG. 5.

The first and seventh assembly ports 64, 70 are interconnected by a channel 71, termed the recovery out channel, formed within the switch assembly 60. The second, third and fifth assembly ports 65, 66, 68 are interconnected with a "Y" shaped channel 72, termed the recovery in channel, formed within the switch assembly 60. The fourth and sixth assembly ports 67, 69 are interconnected by means of a channel 73, termed the high/liquid channel, formed within the switch assembly 60.

The switch assembly 60 has a narrow, central channel 74 formed through its body extending through and from the switch assembly front 63 to and through the switch assembly rear side 62. The central channel 74 is perpendicular to the front 63 and rear 62. A retaining fastener 90 having a proximal end 91 and a threaded distal end 92 is extended, distal end 92 first, from the front 63 through the central channel 74, through the rear 62, into and through an aperture 46 formed in the housing rear 16 in the center of the central cylindrical cavity 19. The fastener proximal end 91 is capped, said cap 93 having a diameter greater than the diameter of the central channel 74, said capped proximal end 91 holding against the switch assembly front 63. A bolt 94 is attached to the fastener distal end 92 and tightened so that the switch assembly 60 is held snugly within the central cylindrical cavity 19.

Six shallow indents 80, 81, 82, 83, 84, 85 are formed in the rear wall 16 of the central cylindrical cavity 19. The indents are positioned equidistant from each other in a circle about the rear wall central aperture 46, circumferentially equidistant from each other 60° apart. The indents have a radial distance from the rear wall central aperture 46 equivalent to one-half the radius of the central cylindrical cavity 19. The radial axis of the first indent 80, defined as the 0° indent position, is parallel to the radial axis of cavity port 50. The radial axis of the second indent 81, defined as the 60° indent position, is parallel to the radial axis of cavity port 51. The radial axis of the third indent 82, defined as the 120° indent position, is parallel to the radial axis of cavity port 52. The radial axis of the fourth indent 83, defined as the 180° indent position, is parallel to the radial axis of cavity port 53. The radial axis of the fifth indent 84, defined as the 240° indent position, is parallel to the radial axis of cavity port 54. The radial axis of the sixth indent 85, defined as the 300° indent position, is parallel to the radial axis of cavity port 55.

The switch assembly 60 has another narrow channel 75 formed within its body extending to and through the switch assembly rear side 62. The channel 75 is perpendicular to the rear 62 and is located on a radial axis approximately 180° from the front port 70 radial axis. A spring loaded positioner pin 95, having a proximal end 97 and a distal end 98 and a length less than the depth of the channel 75 is inserted, proximal end 97 first, into said channel 75. A spring 96 is positioned within said channel 75, said spring 96 being adapted to force the positioner pin distal end 98 a measured distance out of said channel 75. As the switch assembly 60 is turned within the cavity 19, the cavity rear wall 16 forces the pin 95 fully into said channel 75. When an indent is encountered by the pin 95 the spring forces the pin distal end 98 out of the channel 75 to engage the indent. The switching assembly 60 will then stop in a selected, desired position. A reasonable torque pressure on said switch assembly 60 will force the pin 95 out of the indent back into the channel 75 thereby releasing the switch assembly 60 for further positioning.

Each cavity port 50, 51, 52, 53, 54, 55, has a resilient "O" ring 47 about its opening. The "O" rings 47 provide seals between the said cavity ports and the pertinent engaged switch assembly ports 64, 65, 66, 67, 68, 69. The switch assembly 60 also has an "O" ring 76 about its cylindrical side 61 near to the switch assembly front 63. This provides an additional measure of protection to prevent refrigerant vapor and liquid from escaping from the invention 1.

The top left lateral port 30 has a low pressure vapor gauge 48 inserted therein. Said gauge 48 is adapted to sense and measure the pressure from vapors within the left lateral primary channel upper portion 34a. The top right lateral port 32 has a high pressure vapor gauge 49 inserted therein. Said gauge 49 is adapted to sense and measure the pressure from vapors and liquid within the right lateral primary channel upper portion 37a.

The invention 1 is used in combination with a refrigeration system 103 to be worked on, a recovery tank 100 which provides an interim holding vehicle for refrigeration, and a recovery machine 106, which provides a compressor and/or vacuum pump. The refrigeration system 103 has a low pressure port 104 and a high pressure port 105. The recovery cylinder 100 has a vapor port 101 and a liquid port 102. The recovery machine 106 has an "in" port 107 and an "out" port 108. The invention 1 is primarily operated in one of four modes, i.e., Test, Charge, Liquid Recovery, and Vapor Recovery. Regardless of the operating mode, the refrigeration system 103, recovery cylinder 100 and recovery machine 106 (if required) are connected to the invention in the same manner, thereby eliminating the need for conduit connection changes when the operating mode is changed. The refrigeration system low pressure port 104 is connected to the left lateral section bottom port 31 by means of a conduit 3 such as a hose or the like. The refrigeration system high pressure port 105 is connected to the right lateral section bottom port 33 by means of a conduit 3. The recovery tank vapor port 101 is connected to the central section right bottom port 25 by means of a conduit 3. The recovery tank liquid port 102 is connected to the central section left bottom port 24 by means of a conduit 3. The recovery machine "in" port 107 is connected to the central section left top port 22 by means of conduit 3. The recovery machine "out" port 108 is connected to the switch assembly front port 70 by means of conduit 3. The invention also provides an optional means for use of a recovery machine subcool feature by connecting a recovery machine subcool port 109 to the central section right top port 23 by means of a conduit 3.

OPERATION

Figure 9:
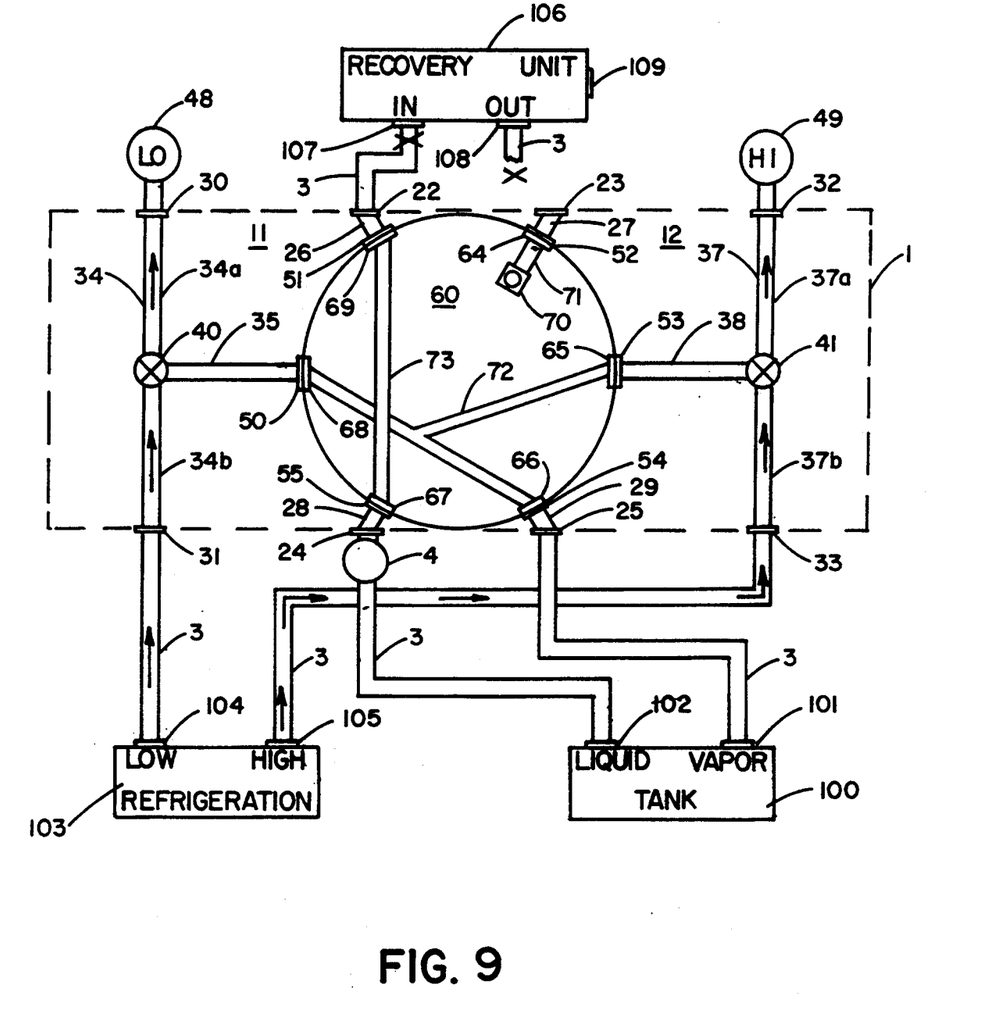
FIG. 9 is a schematic view of the invention in a test mode.

In the invention TEST mode, a recovery machine 106 is not required. The switch valves 40, 41 are set so that the secondary channels 35, 38 are disengaged from the primary channels 34, 37. The primary channel upper sections and lower sections 34a, 34b and 37a, 37b are always open to each other forming continuous paths 34 and 37 to the respective gauges 48 and 49. The position of the switch assembly 60 is not relevant. Vapor will flow from the refrigeration system low pressure port 104 through conduit 3 to the left lateral section bottom port 31, into the left lateral primary channel 34 to the low pressure gauge 48. Liquid and/or high pressure vapor will flow from the refrigeration system high pressure port 105 through conduit 3 to the right lateral section bottom port 33, into the right lateral primary channel 37 to the high pressure gauge 49. The gauges 48, 49 provide service personnel with the information required to service the refrigeration system 103.

Figure 10:
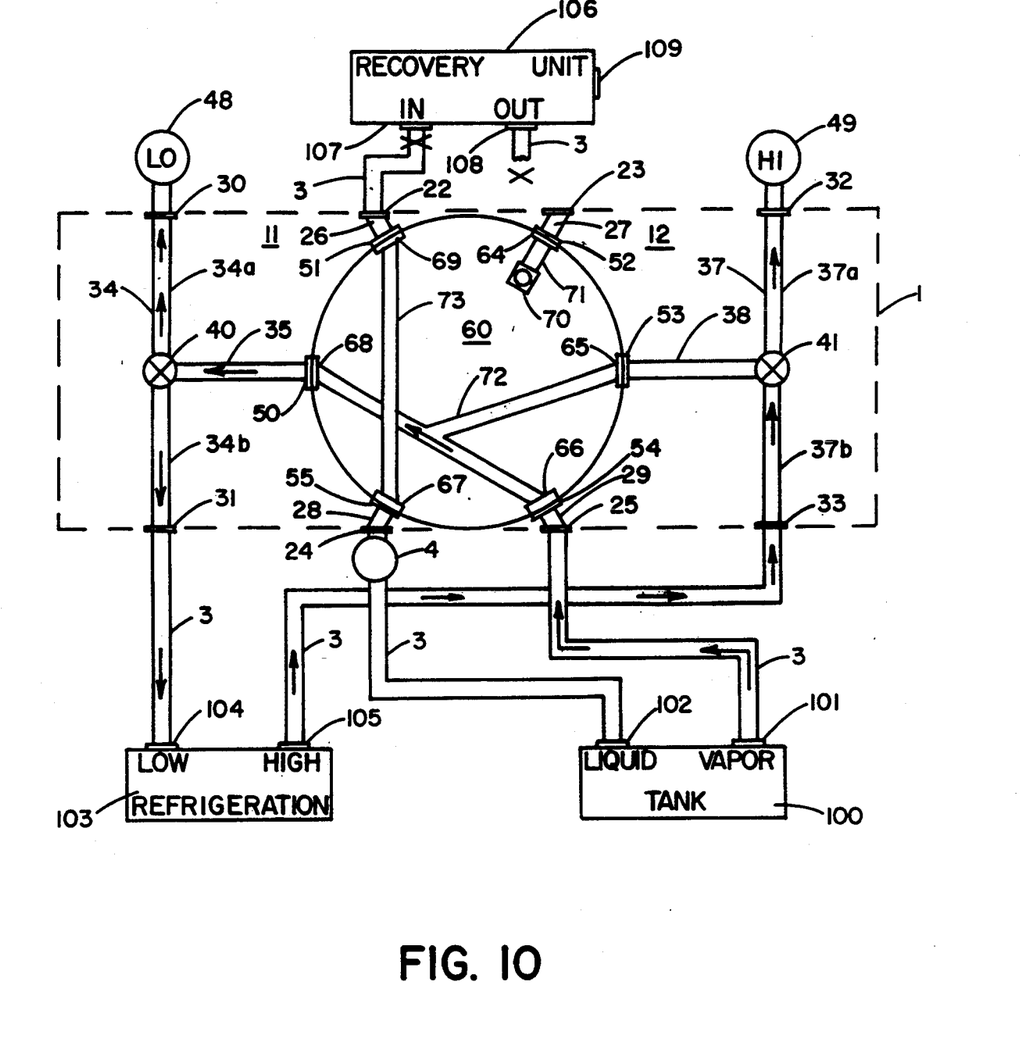
FIG. 10 is a schematic view of the invention in a charging mode.

In the invention CHARGE mode, a recovery machine 106 is not required. The switch assembly 60 is turned so that the switch assembly front port 70 is aligned with the central cavity 120° port 52. The switch valves 40 is set so that the primary channel 34 and its respective gauge 48 form a continuous path with its secondary channels 35. This alignment will cause vapor from the recovery cylinder vapor port 101 to travel through conduit 3 to the central section bottom right port 25, through channel 29 to port 54, into port 66, into the Y-shaped channel 72 to port 68, through port 50 into the left lateral secondary channel 35, through switch 40 into the left lateral primary lower channel 34b to port 31, through conduit 3 into the refrigeration system low pressure port 104.

Figure 11:
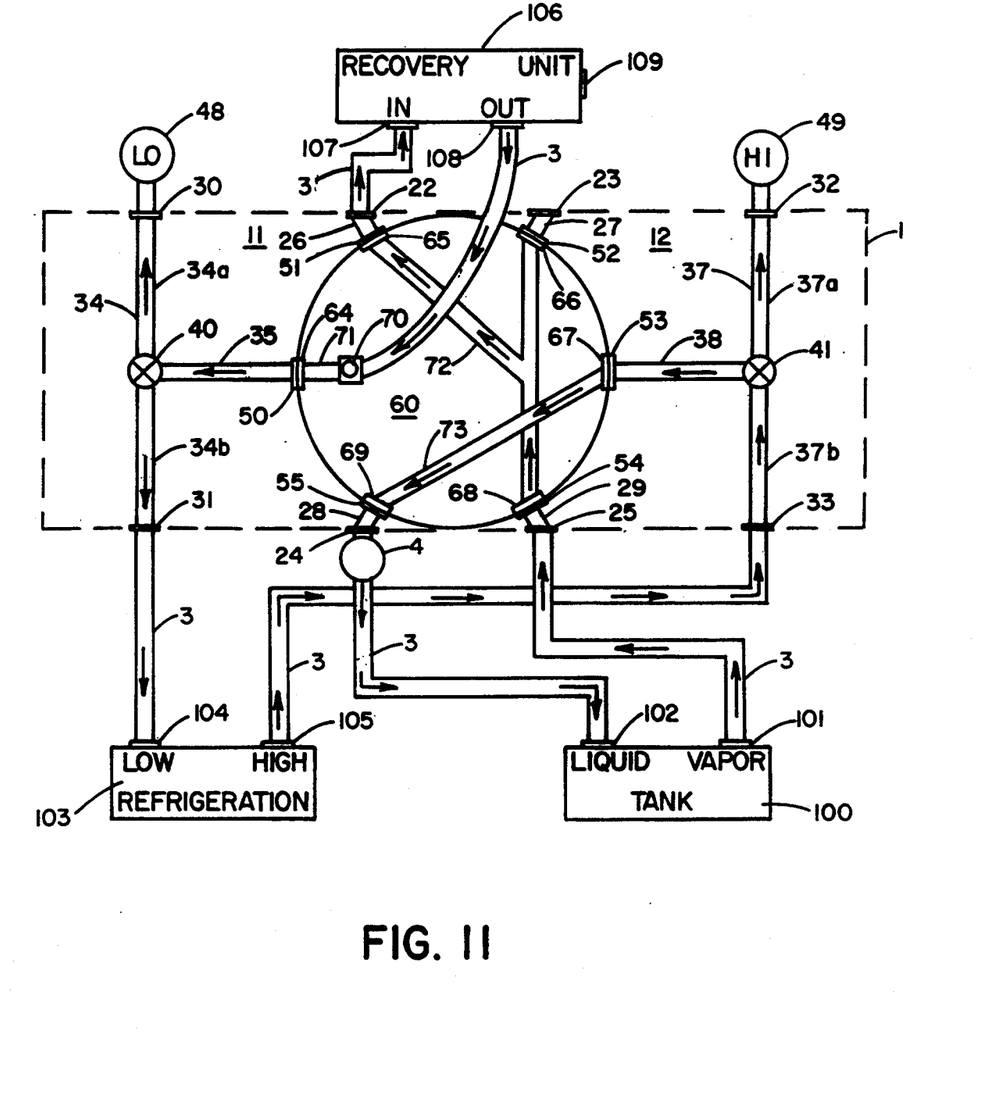
FIG. 11 is a schematic view of the invention in a liquid recovery mode.

In the invention LIQUID RECOVERY mode, a recovery machine 106 is required. The switch assembly 60 is turned so that the switch assembly front port 70 is aligned with the central cavity 0° port 50. The switch valves 40, 41 are set so that the primary channel upper sections 34a, 37a and their respective gauges 48, 49 and the primary channel lower sections 34b, 37b each form continuous paths with their respective secondary channels 35, 38. This alignment will cause the recovery machine output port 108 to generate vapor pressure through conduit 3, to the switch assembly front port 70, through channel 71 and the switch assembly port 64 to the cavity port 50, into the left lateral secondary channel 35, through the switch valve 40, into the lower left lateral primary channel 34b, out through the left lateral bottom port 31, into conduit 3, into the low pressure port 104 of the refrigeration system 103 being recovered. The increasing vapor pressure in the refrigeration system 103 being recovered from the recovery machine 106 "pushes" the liquid in the refrigeration system 103 being recovered out through the high pressure port 105 into conduit 3, to the right lateral bottom port 33, into the lower right lateral primary channel 37b, through the switch valve 41, into the right lateral secondary channel 38, through the cavity port 53 into the switch assembly port 67, through the switch assembly channel 73, to the switch assembly port 69, through the cavity port 55 into the channel 28, to the left bottom central port 24, into conduit 3, into the liquid port 102 of the recovery tank 100. The recovery machine 106 draws vapor into its "in" port 107 from the vapor port 101 of the recovery tank 100 across the path: recovery tank vapor port 101, conduit 3, right bottom central port 25, channel 29, cavity port 54, switch assembly port 68, "Y" channel 72, switch assembly port 65, cavity port 51, channel 26, left top central port 22, conduit 3, recovery machine "in" port 107. The LIQUID RECOVERY process is monitored via a sight glass 4 installed in the path between the left bottom central port 24 and the conduit 3 leading to the recovery tank liquid port 102.

Figure 12:
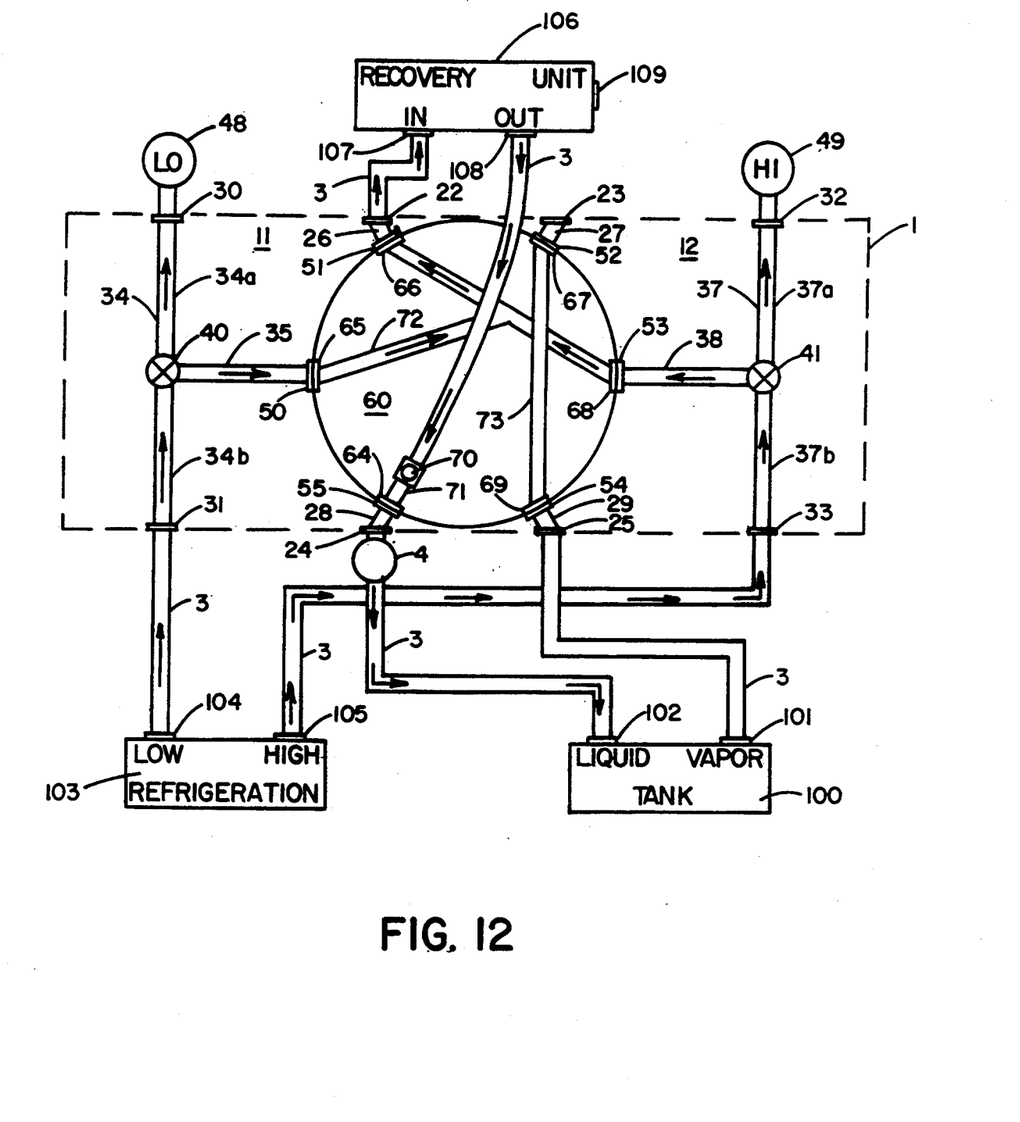
FIG. 12 is a schematic view of the invention in a vapor recovery mode.

In the invention VAPOR RECOVERY mode, a recovery machine 106 is required. The switch assembly 60 is turned so that the switch assembly front port 70 is aligned with the central cavity 300° port 55. The switch valves 40, 41 are set so that the primary channel upper sections 34a, 37a and their respective gauges 48, 49 and the primary channel lower sections 34b, 37b each form continuous paths with their respective secondary channels 35, 38. This alignment will cause the recovery machine "in" port 107 to "pull" the remaining vapor from the refrigeration system 103. The recovery machine 106 establishes a negative pressure at the "in" port 107 thereby drawing vapor from a first path comprised of: conduit 3, left top central port 22, channel 26, cavity port 51, switch assembly port 66, "Y" channel 72, switch assembly port 65, cavity port 50, left lateral secondary channel 35, valve switch 40, left lateral lower primary channel 34b, left lateral bottom port 31, conduit 3, low pressure port 104 of the refrigeration system 103 being recovered; and a second path comprised of: conduit 3, left top central port 22, channel 26, cavity port 51, switch assembly port 66, "Y" channel 72, switch assembly port 68, cavity port 53, right secondary channel 38, valve switch 41, right lateral lower primary channel 37b, right lateral bottom port 33, conduit 3, high pressure port 105 of the refrigeration system 103 being recovered. The recovery machine 106 outputs the vapor "pulled" from the refrigeration system 103 through its "out" port 108, into conduit 3 attached to the switch assembly front port 70, through channel 71 and the switch assembly port 64 to the cavity port 55, into channel 28 to the left bottom central port through conduit 3 into the liquid port 102 of the recovery cylinder 100.

It is understood that the above-described embodiment is merely illustrative of the application. Other embodiments may be readily devised by those skilled in the art which will embody the principles of the invention and fall within the spirit and scope thereof.

I claim:

1. In combination with a refrigeration system to be worked on and having a low pressure port and a high pressure port, a recovery tank providing an interim holding vehicle for refrigeration and having a vapor port and a liquid port, and a recovery machine providing compressor and vacuum pump functions and having input port and an output port, a flow control manifold and gauge, comprising:

a housing generally divided into a central section, and left and right lateral sections, and having a top, bottom, front, rear, left side and right side, said lateral sections having generally rectangular shapes and protruding leftward and rightward from said central section, said central section having a right circular cylindrical cavity formed therein, said cavity having an open front in the same plane as the housing front and a cylindrical side wall extending from the housing rear to the open front;

four open ports formed in said central section, one said port formed on the housing top near to the left lateral section, another said port formed on the housing top near to the right lateral section, another said port formed on the housing bottom near to the left lateral section, and the last said port formed on the housing bottom near to the right lateral section, each said port being interconnected by an individual channel formed within said central section to said central section cavity;

two open ports formed in said left lateral section, one said port formed on the housing top and the other said port formed on the housing bottom, said left lateral ports being interconnected by a primary channel formed within the left lateral section;

a secondary channel formed within the left lateral section interconnecting the left lateral primary channel with said central section cavity;

two open ports formed in said right lateral section, one said port formed on the housing top and the other said port formed on the housing bottom, said right lateral ports being interconnected by a primary channel formed within the right lateral section;

a secondary channel formed within the right lateral section interconnecting said right lateral primary channel with said central section cavity;

a switch valve in each lateral section positioned at the junction formed by its primary channel and secondary channel, each said switch valve being adapted to close off a secondary channel from a primary channel;

six open cavity ports formed in the cavity side wall, said cavity ports being positioned in a plane parallel to the housing front and rear at points circumferentially equidistant from each other 60° apart, wherein said central section channels and lateral section secondary channels open into the central section cavity through said open cavity ports;

two gauges connected to said housing; and a cylindrical switch assembly rotatably and concentrically affixed within the housing central cavity, said switch assembly having a generally right circular cylindrical shape with a cylindrical side extending from a rear side to a front side, said rear side and front side being in parallel planes, said switch assembly having a radial diameter slightly less than the radial diameter of said central cavity;

six open ports formed in said switch assembly cylindrical side, said ports being positioned in a plane parallel to the switch assembly front and rear at points circumferentially equidistant from each other 60° apart, and defined consecutively as first, second, third, fourth, fifth and sixth switch assembly ports;

an open port formed in said switch assembly front side, said port being positioned near to the switch assembly side along a radial axis parallel to the radial axis of said first switch assembly port; and three channels formed within said switch assembly, one said channel interconnecting said first switch assembly port with said switch assembly front side port, another said channel interconnecting said second, third and fifth switch assembly ports, the last said channel interconnecting said fourth and sixth switch assembly ports.

2. A flow control manifold and gauge as recited in claim 1, wherein said gauges connected to said housing are comprised of:

a low pressure vapor gauge inserted into said open port in said left lateral section housing top, said gauge being adapted to sense and measure the pressure from vapors within the left lateral primary channel; and a high pressure vapor gauge inserted into said open port in said right lateral section housing top, said gauge being adapted to sense and measure the pressure from vapors and liquid within the right lateral primary channel.

3. A flow control manifold and gauge as recited in claim 2, further comprising:

a narrow, central channel formed through said switch assembly extending through and from the switch assembly front to and through the switch assembly rear side, said central channel being perpendicular to said front and rear sides;

an aperture formed in the housing rear in the center of the central cylindrical cavity;

a retaining fastener having a capped proximal end, said capped proximal end having a diameter greater than the diameter of said central channel and a threaded distal end, said fastener being positioned distal end first, through said switch assembly front, through said central channel, through said switch assembly rear side, into and through said housing rear aperture, said capped proximal end holding against the switch assembly front;

a bolt attached to said fastener distal end and tightened so that the switch assembly is held snugly within the central cylindrical cavity.

4. A flow control manifold and gauge as recited in claim 3, further comprising:

six shallow indents formed in a rear housing wall portion wall of the central cylindrical cavity, said indents being positioned equidistant from each other in a circle about the rear wall central aperture, circumferentially equidistant from each other 60° apart;

a second narrow channel formed within said switch assembly extending from said switch assembly rear side, said channel being perpendicular to the switch assembly, and radially positioned coincident with the radial position of the indent circle radius;

a positioner pin, having a proximal end, a distal end and a length less than the depth of said channel, said pin being inserted, proximal end first, into said channel; and a spring positioned within said channel, said spring being adapted to force the positioner pin distal end a measured distance out of said channel for engagement with one of said indents.

5. A flow control manifold and gauge as recited in claim 4, further comprising:

a resilient "O" ring positioned about and attached to each said cavity port; and a resilient "O" ring positioned about and attached to said switch assembly cylindrical side, near to said switch assembly front.

6. A flow control manifold and gauge as recited in claim 5, wherein:

said refrigeration system low pressure port is connected to the left lateral section bottom port by means of a conduit;

said refrigeration system high pressure port is connected to the right lateral section bottom port by means of a conduit;

said recovery tank vapor port is connected to the central section right bottom port by means of a conduit;

said recovery tank liquid port is connected to the central section left bottom port by means of a conduit;

said recovery machine input port is connected to the central section left top port by means of conduit; and said recovery machine output port is connected to the switch assembly front port by means of conduit.

7. A flow control manifold and gauge as recited in claim 6, further comprising:

a subcool feature port on said recovery machine, wherein subcool feature port is connected to the central section right top port by means of a conduit.

8. A flow control manifold and gauge as recited in claim 7, further comprising:

two actuator handles positioned external to the housing, each said handle being interconnected to a switch valve by an actuator arm.

9. A flow control manifold and gauge as recited in claim 8, wherein:

said cavity ports are located in a plane at an approximate longitudinal midpoint between the cavity front and housing rear; and said six switch assembly ports are located in a plane at an approximate longitudinal midpoint between the switch assembly front and rear.

* * * * *